US007072596B2

(12) United States Patent
Smith et al.

(10) Patent No.: US 7,072,596 B2
(45) Date of Patent: Jul. 4, 2006

(54) PAPER TYPE INPUT OPTIMIZING PRINT QUALITY

(75) Inventors: David E. Smith, Emmett, ID (US); Gerard J. Carlson, Boise, ID (US); George V. McIlvaine, Boise, ID (US); Darryl J Richter, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 138 days.

(21) Appl. No.: 10/695,254

(22) Filed: Oct. 27, 2003

(65) Prior Publication Data

US 2005/0089339 A1 Apr. 28, 2005

(51) Int. Cl.
*G03G 15/00* (2006.01)
*B41J 2/435* (2006.01)
*G06K 1/00* (2006.01)

(52) U.S. Cl. .......................... 399/45; 347/264; 358/1.9

(58) Field of Classification Search .................. 399/38, 399/45, 389, 390, 42; 235/462, 494; 358/1.13, 358/1.6, 1.9; 347/264
See application file for complete search history.

(56) References Cited

U.S. PATENT DOCUMENTS

| | | | |
|---|---|---|---|
| 5,053,612 A | 10/1991 | Pielemeier et al. | |
| 5,659,800 A | 8/1997 | Zhang et al. | |
| 6,148,162 A | 11/2000 | Huston et al. | |
| 6,244,511 B1 | 6/2001 | Vandenberg et al. | |
| 6,305,607 B1 | 10/2001 | Katz et al. | |
| 6,340,114 B1 | 1/2002 | Correa et al. | |
| 6,536,670 B1 | 3/2003 | Postman et al. | |
| 6,578,767 B1 | 6/2003 | Barkan et al. | |
| 6,873,351 B1 * | 3/2005 | Ito | 347/264 |
| 2002/0066782 A1 | 6/2002 | Swaminathan et al. | |
| 2002/0106209 A1 | 8/2002 | Niimura et al. | |
| 2003/0184785 A1 * | 10/2003 | Guddanti | 358/1.13 |

FOREIGN PATENT DOCUMENTS

| | | |
|---|---|---|
| EP | 0605630 B1 | 2/2001 |
| WO | WO 99/64980 | 12/1999 |
| WO | WO 01/81093 | 11/2001 |

* cited by examiner

*Primary Examiner*—Hoan Tran

(57) ABSTRACT

A Method for controlling image-forming device operations through use of bar code information located on the packaging of image media. Bar code information is used to adjust internal image-forming device operational parameters in order to maximize image and print quality.

20 Claims, 4 Drawing Sheets

PAPER TYPE INPUT OPTIMIZING PRINT QUALITY

BACKGROUND OF THE INVENTION

Image-forming devices, such as printers and copiers, use a variety of media that have numerous characteristics, including, for example, size, shape, material composition, color, weight, texture, roughness, resistivity, thickness, stiffness, grain direction, chemical composition, and acidity, all of which affect print quality. Given the numerous characteristics which determine the type of media, there are a large number of media available and in use in the market today. Without knowing the particular characteristics of the specific media being used, the image-forming device, which is optimized to provide good print quality on most standard or low-quality media, compromises otherwise higher print quality when higher-quality media is used. Similarly, there are many different types of image-forming devices in use, such as, for example, printers, copiers, scanners, and facsimile machines, each of which are made by numerous different manufacturers incorporating varying operational parameters into the devices. Many of these image-forming devices also require special types of print media for adequate performance. Thus, it is desirable that the image-forming device recognize the type of media being used or loaded into the supply or input tray.

Most image-forming devices in current use rely on a user to provide or input information about the type of media being used via a printer control panel. However, this particular system also depends on the user to input new parameters each time the media type is changed for the setting to remain accurate. Additional inaccuracies are likely to occur when the image-forming device is programmed by multiple users.

With respect to the size of the media, several methods of conveying the dimensions of the print media loaded in a supply tray have been developed. In one such method, a unique set of trays configured to accommodate a particular size of media is provided, allowing loading specifically sized media. This approach disadvantageously increases the cost of the image-forming device by requiring molding of various sizes and configurations of trays. Additionally, the user must buy and store multiple trays needed to support the many media sizes used. An alternative approach uses media trays that can be configured for all of the various sizes of media. While this approach reduces manufacturing cost and the purchase and storage of multiple trays, the user must still input the size of media loaded in the tray. Furthermore, these approaches do not identify the characteristics of the media being used.

Various other approaches are known in the art. One such approach is the use of default settings in the image-forming device for all media types. This provides acceptable print quality on most standard media types, but does not provide good print quality on non-standard media, such as photo papers and transparencies. Another approach relates to the use of media detection sensors, where several sensor types (e.g., optical, weight, resistivity, and reflectance sensors) are used. While these sensors are able to characterize media on a page-by-page basis, they are expensive and are limited to higher-end commercial printers.

Another approach relies on manual entry of the paper type by the user via control panel buttons. As with other manual entry methods, this method is error prone and requires incorporation of control panels having 10-key numeric pads (or cumbersome entry with more limited key pads) on the image-forming device. Additionally, the user can be tempted to use the default settings instead of reading a code number and entering the same into the image-forming device.

Other approaches rely on the use of bar code readers. One approach uses bar code readers located inside of paper trays. However, use of bar code readers in each individual tray increase the cost of production and complicates the design of image-forming devices that use multiple optional paper trays. This approach also requires paper that must be specially packaged in a ream with a perforated end, which must be designed so as to expose the media without discarding the bar code on the ream wrapper. However, no paper manufacturer currently ships a ream wrapper having such a configuration. Also, this system requires that the bar code be located at specific locations on the ream wrapper in order to be read by the specially designed media tray. Unfortunately, the bar code placements on media vary between manufacturers.

Bar codes have also been printed directly on the face of the media at various locations. However, this particular method is only suitable for use on very expensive media due to the high expense created in printing identification information on each and every page of media. Alternatively, bar code information has been printed on the edge of the media. While this method can be quicker and less expensive than printing bar codes directly on the face of the media, the media manufacturer is still required to pre-print each media ream before the media can be used in an image-forming device having a bar code reader. Thus, the invention is limited to use of media from the limited number of suppliers that employ such bar code techniques.

BRIEF SUMMARY OF THE INVENTION

The present invention relates to systems and methods for controlling image-forming device operations through use of bar code information located on the packaging of image media.

In a particular embodiment of the invention, the bar code information located on the packaging of the image media is passed across the face of the bar code reader located on the exterior of the image-forming device. A method for identifying characteristics and type of image media loaded into an image-forming device includes providing image media that is contained within a package, the package having a bar code on a surface thereof that contains information about the image media. Information encoded in the bar code is sensed with a bar code reader located external to a housing of the image-forming device. Operational settings for the image-forming device are modified or set based on the bar code information retrieved. The image-forming device settings are assigned to an image media tray in the image-forming device.

In a particular embodiment of the invention, an image-forming device including a housing and at least one media tray for receiving image media is provided. The image-forming device includes a bar code reader for sensing information encoded in a bar code located on an outer surface of an image media package. The bar code reader is located external to the image-forming device housing. The image-forming device includes memory that is operably coupled to the bar code reader for receiving and storing the bar code information. An image-forming device controller is operably coupled to the bar code reader and to the memory for retrieving the bar code information from the memory, for modifying image-forming device settings, and for assigning the image-forming device settings to a selected media tray.

In another embodiment of the invention, a printer device including a housing and at least one media tray for receiving image media is provided. The printer device includes a bar code reader for sensing information encoded in a bar code located on an outer surface of a printer paper package. The bar code reader is located external to the image-forming device housing. The printer device includes memory that is coupled to the bar code reader for receiving and storing the bar code information. A printer device controller is coupled to the bar code reader and to the memory for retrieving the bar code information from the memory, for modifying image-forming device settings, and for assigning the image-forming device settings to a selected media tray.

BRIEF DESCRIPTION OF THE SEVERAL VIEWS OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

The present invention generally provides an image-forming device with a bar code reader located on the face or peripherally connected to the exterior of the image-forming device. Although the invention is described in terms of general printer technology, it is understood that the present invention is equally applicable to other forms of image-forming devices and technology, including, without limitation, printers, photocopy machines, facsimile machines, and scanners. Accordingly, the present invention may be embodied in any image-forming device and is not limited to any specific embodiments illustrated herein.

Although the image transfer medium is typically print media consisting of a paper product (e.g., such as a sheet of paper, cardstock, or the like) the principles of the present invention are equally applicable to other image media, such as plastic and transparencies. However, for ease of discussion purposes, print media or printer paper will be referred to as the image transfer medium in this disclosure. It will be understood, further, that conventional single sided print operations, and two sided print operations, are within the purview of the present invention.

Figure 1:
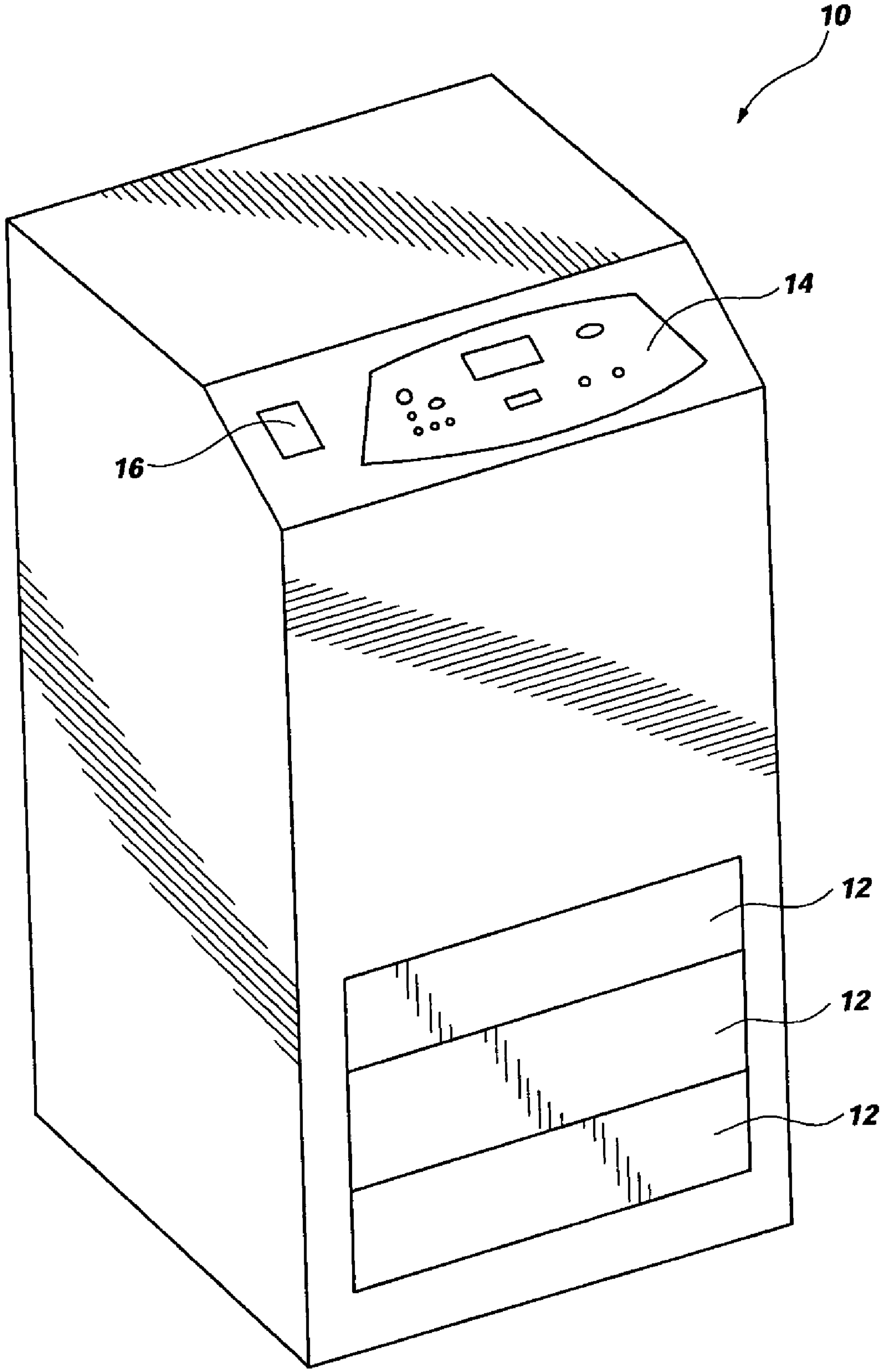
FIG. 1 is a schematic diagram of one embodiment of a printer adapted to carry out the present invention.

Given the foregoing, FIG. 1 shows a schematic block diagram of a printer 10 adapted to carry out an embodiment of the present invention. One or more paper tray(s) 12 are provided to hold sheets of printer paper. The printer 10 includes a control panel 14 for entering operational functions and instructions, and displaying information about the printer 10. An image reader 16 may be disposed on the exterior of the printer 10. In a particular embodiment of the invention, the image reader 16 is a bar code reader 16.

Figure 2:
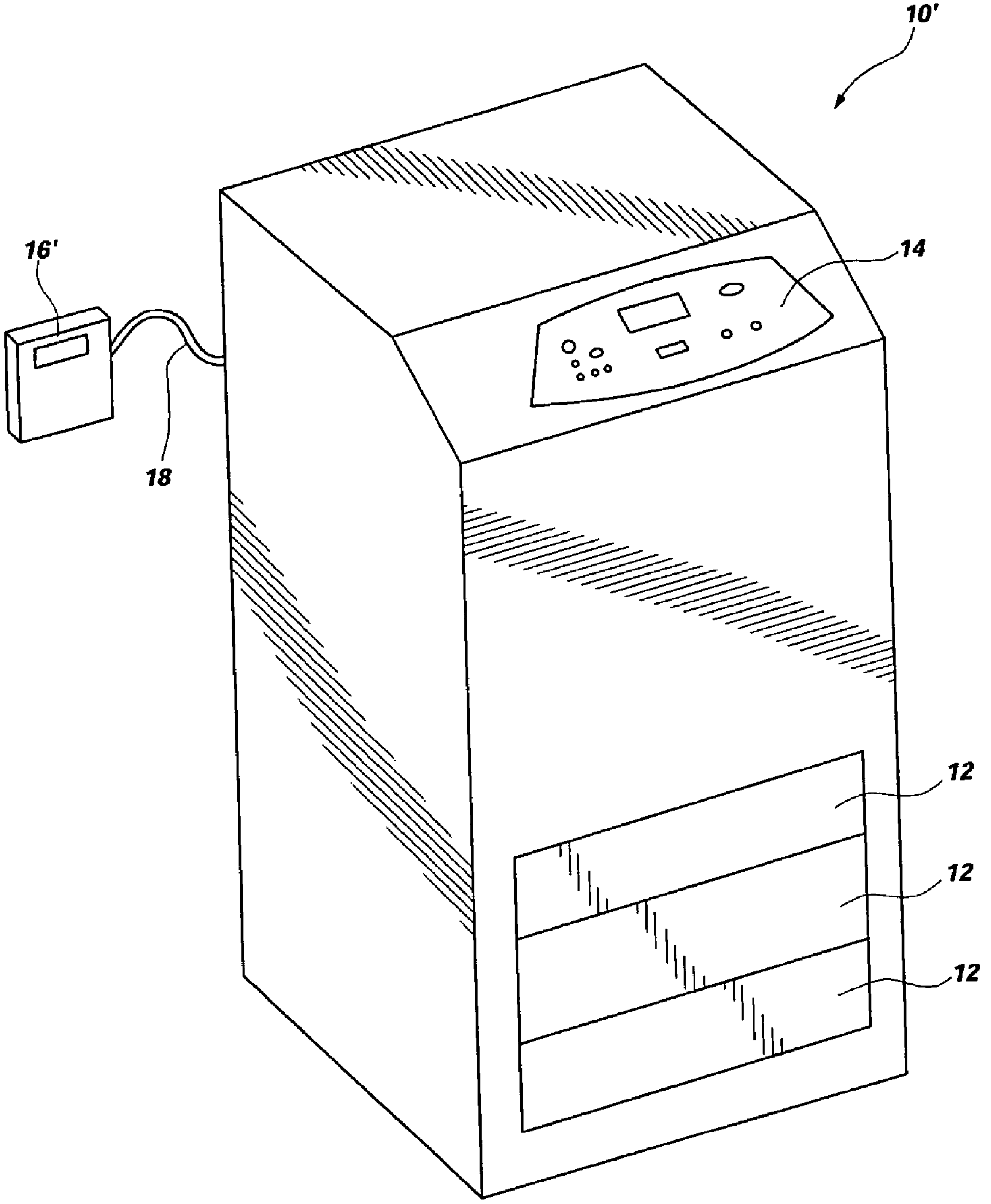
FIG. 2 is a schematic diagram of a second embodiment of a printer adapted to carry out the present invention.

As illustrated in FIG. 2, an alternative embodiment of the invention includes a bar code reader 16' that is designed as a "stand alone" system that is operationally connected to the printer 10'. For example, bar code reader 16' may be designed as an independent unit that is electrically connected to the printer 10' by an electrical connection 18 (e.g., electrical wiring) to communicate information sensed by the bar code reader 16' to the printer 10'. It is understood that the bar code reader 16' can be in communication with printer 10 through any other communication means, such as, for example, infrared connection, blue-tooth technology, or any other suitable means known in the art.

Figure 3:
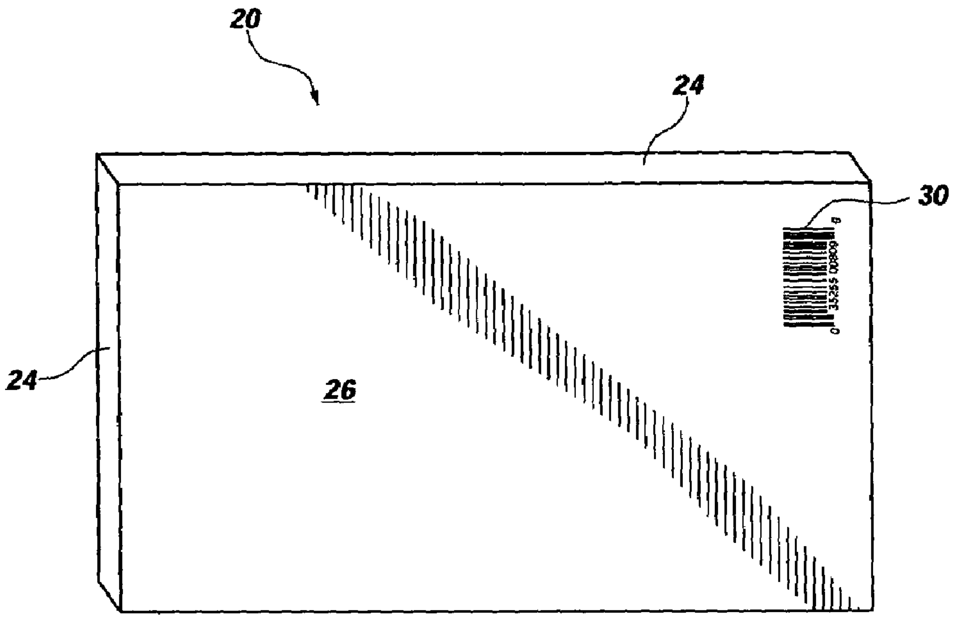
FIG. 3 is a perspective view of a representative, standard print media package for use with an embodiment of the present invention.

Printer paper is typically provided in a wrapped package made of heavy paper of other suitable material to protect and contain the print media during shipment and storage. Each package of printer paper is also referred to as "reams" of paper and usually contains 500 sheets of printer paper per package. In use, the printer paper is removed from the package prior to loading the paper in the paper tray 12 for input to the printer 10. As illustrated in FIG. 3, a standard package 20 of print paper has side surfaces 24, a front face surface 26, and a back face surface (not shown). An identifying image 30 is typically imprinted on any outside surface (i.e., side surface, back face surface, and/or back face surface) of the package 20. In a particular embodiment of the invention, the identifying image is located on the front face surface 26 and consists of a bar code that encodes selected information, as is known in the art, relative to the print media contained within the package 20. The identifying image 30 is typically preprinted on the package 20 of commercially available printer paper. Where such preprinted identifying image 30 is not provided, an identifying image 30 having customized information can be added to the package 20 by the end user, distributor, print shop, or custom manufacturer.

The present invention permits multiple media trays or cassettes in the printers to contain paper having unique and varied characteristics and sizes. Therefore, where multiple paper types are loaded into different trays of the same printer, the printer will optimize its internal processes for each paper type, depending on the tray from which the paper to be printed is loaded. A single, common bar code reader can be used for multiple trays.

Figure 4:
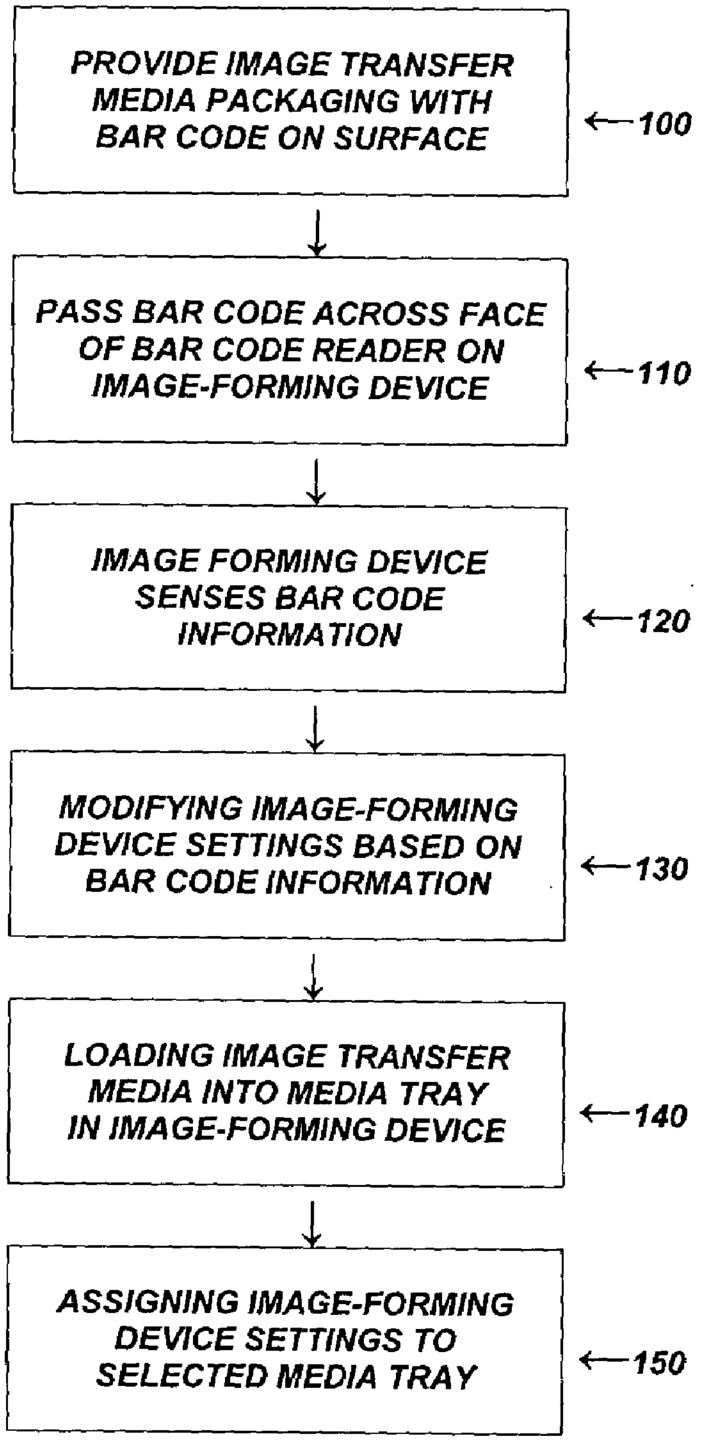
FIG. 4 is a flow chart depicting an embodiment of the method for identifying characteristics of image media loaded into an image-forming device.

FIG. 4 is a flow chart depicting the present invention method of controlling operations of an image-forming device (printer) by using an identifying image in the form of bar code indicia disposed on the outer packaging of an image transfer medium to identify information about the image transfer image. As illustrated in the flow chart at 100, the present invention takes advantage of the bar code information presently available on the ream of most, if not all, printer or copy paper. The bar code information is typically disposed on the ream of paper when the paper and its packaging is originally manufactured. However, where such bar code information is not so disposed in the original packaging, bar code information can be added to any paper packaging or reams of paper subsequent to original manufacturing. Alternatively, where customized or altered paper is used, a customized bar code containing information about the custom paper can be added or incorporated into the packaging or ream of paper. The manner of placement of the bar code is not crucial to the present invention, so long as the bar code is positioned on any outside surface of the packaging or ream of paper such that the bar code can be sensed by the printer as described further herein.

Next 110, the bar code information (such as bar code 30) located on the packaging of the image media is passed across the face of the bar code reader (such as bar code reader 16). As previously discussed, the bar code reader may be located on the exterior of the image-forming device or, alternatively, as an independent unit that is operably connected to the printer (such as bar code reader 16'). The image-forming device may also prompt a user to pass or swipe the bar code on the media packaging when it senses an open tray. The prompt from the image-forming device may occur at any time that a tray is opened and may occur during printer operations. In another embodiment, the prompt may cause printer operations to be placed on standby while the bar code information is passed across the face of the bar code reader. In yet another embodiment, the prompt for input of the bar code may occur after the existing printer operations are completed.

The printer then senses the bar code indicia on the paper, as depicted at 120. The sensing can be accomplished through use of any suitable conventional image sensing technology known in the art. For example, a conventional optical sensor can be coupled to circuitry to sense the indicia. In a particular embodiment, the sensor can include a light source that directs a light upon the bar code information (located on the print paper package) in a coded form that identifies the characteristics of the print paper for modifying the operational settings of the printer system. As the bar code on the surface of the print paper package is moved onto or across the sensor, light is reflected from the bar code area back to a photosensor. The photosensor may include a reflective photosensor, although a transmission type photosensor, phototransistor, photodiode or other suitable light detection device can be used. Upon detection of the light, the photosensor generates a signal representative of the light detected, which signal is transmitted to translation circuitry of a printed circuit assembly (which includes Random Access Memory). The translation circuitry can be engineered by conventional means in the art and is responsible for translating the received signal to a printer command signal for controlling printer operations.

As generally represented at 130, the settings of the image-forming device are modified based on the bar code information sensed by the image-forming device. More specifically, a signal can be produced correlating the bar code information sensed by the image-forming device. The bar code information can then be transmitted or sent to a printer command signal. As previously described, the command signal is a signal that is received by the printer and interpreted to set operational printing parameters for the particular image media being fed into the image-forming device. If the command signal is valid, printing operations are properly controlled. If the command signal is not valid (for example, due to a failed reading, incorrect placement of the indicia, or other error), an error signal results for which printing operations respond accordingly (e.g., by requesting the user to pass the bar code across or onto the bar code reader).

In one particular embodiment, the printer controller accesses a table of existing information regarding various image media (e.g., printer paper types and their particular characteristics) that is stored in the printer memory, such as random access memory (RAM), non-volatile RAM (NVRAM), or read only memory (ROM), which matches an assigned media value to the media and modifies the image-forming device settings to correspond to the various selected media characteristics. The table of existing information may also be stored on a hard disk and loaded into RAM when the printer is powered up. Alternatively, information relating to the various image media can be accessed and downloaded by accessing information from other databases, networks, and computers via any suitable means, such as, for example, an internet connection, local area networks, private networks or simple printer-to-server connections. The assigned media values may be loaded in the RAM by the printer manufacturer or by a user for each type of media to be used. Media values can also be added or updated to the existing media values located in the RAM. If the encoded media type is a new media that is not already contained in the RAM, a new entry and file for the encoded media type can be created or opened. Media values may include, but are not limited to, media material, size, shape, material composition, color, weight, texture, roughness, resistivity, thickness, stiffness, grain direction, chemical composition, and/or acidity. Other media values may include image-forming device settings, such as, for example, pen to paper spacing, print speeds, developer/dryer temperature, and/or electrical bias.

Printer operations are controlled responsive to the command signal produced from the interpreted indicia on the paper. Since the indicia may contain a variety of coded information, numerous printer commands may be identifiable therefrom. For example, indicia encoded on print paper with conventional bar coding (and scanning) technology can include a virtually limitless number of distinguishably encoded data and resulting commands. As such, it will be clear to one of ordinary skill in the art that many printer operations may be controlled according to the method of the present invention. In this manner, in addition to modifying or controlling the image-forming parameters and characteristics, printer operations can be optimized to improve operations after the image is formed (e.g., paper pick, fusing, and paper handling). Accordingly, the command signals generated need only correlate to conventional printer commands.

If a user does not pass the bar code information over or across the face of the bar code reader, the image-forming device may use existing settings or defaults for a particular tray being accessed. Alternatively, the image-forming device may prompt a user to choose a default setting for the selected tray.

Next 140, the printer paper is fed into one or more media trays located in the image-forming device, as conventionally occurs in image transfer operations. As is known in the art, conventional image-forming devices, such as printers, may include multiple media trays (e.g., printer paper trays) to receive and hold one or more different types of media.

As generally represented at 150, the settings of the image-forming device are updated and assigned to the media tray presently selected. In one particular embodiment where the image-forming device is a printer, the printer controller updates the printer media settings when the printer is started (at power-up) or when the printer is reset. The printer (image-forming device) controller may also update the printer media settings whenever the media tray is changed, such as when a user selects a different or new media tray, when a user submits a print job requiring a different type of media than that loaded in a selected media tray, or when a media tray is opened or removed and then subsequently closed or replaced (such as when a user changes the media type in a media tray).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope thereof as defined by the following appended claims.

What is claimed is:

1. A method for identifying characteristics of image media loaded into an image-forming device, comprising:

providing image media, said image media being contained within a package, said package having a bar code on a surface of said package containing information about said image media;

sensing information encoded in said bar code with a bar code reader located external to a housing of the image-forming device;

reading said bar code information with an image-forming device controller and updating the image-forming device settings upon activation or resetting of the image-forming device; and assigning said image-forming device settings to an image media tray in said image-forming device.

2. The method of claim 1, wherein sensing information encoded in said bar code comprises passing said bar code across a face of a bar code reader.

3. The method of claim 1, wherein sensing information encoded in said bar code comprises passing said bar code across a face of a bar code reader located on an exterior surface of said image-forming device housing.

4. The method of claim 1, wherein sensing information encoded in said bar code comprises passing said bar code across a face of a bar code reader that is located peripheral to and in communication with said image-forming device.

5. The method of claim 1, wherein sensing information encoded in said bar code comprises sensing image media characteristics and attributes describing type of image media contained in said package.

6. The method of claim 1, wherein assigning said image-forming device settings to an image media tray comprises assigning image-forming device settings regarding media material, size, shape, material composition, color, weight, texture, roughness, resistivity, thickness, stiffness, grain direction, chemical composition, or acidity of said image media.

7. The method of claim 1, wherein providing said image media comprises providing printer paper, photocopy paper, or transparencies.

8. The method of claim 1, wherein said image-forming device comprises a printer, a photocopy machine, a facsimile machine, or a scanner.

9. The method of claim 1, further comprising prompting a user to pass said the bar code over said bar code reader when said image-forming device senses an open tray.

10. The method of claim 1, further comprising accessing information regarding various image media from other databases, networks, or computers.

11. A method for identifying characteristics of image media loaded into an image-forming device, comprising:

providing image media, said image media being contained within a package, said package having a bar code on a surface of said package containing information about said image media;

sensing information encoded in said bar code with a bar code reader located external to a housing of the image-forming device;

reading said bar code information with an image-forming device controller and updating the image-forming device settings and assigning said image-forming device settings to an image media tray in said image-forming device.

12. The method of claim 11, wherein sensing information encoded in said bar code comprises passing said bar code across a face of a bar code reader.

13. The method of claim 11, wherein sensing information encoded in said bar code comprises passing said bar code across a face of a bar code reader located on an exterior surface of said image-forming device housing.

14. The method of claim 11, wherein sensing information encoded in said bar code comprises passing said bar code across a face of a bar code reader that is located peripheral to and in communication with said image-forming device.

15. The method of claim 11, wherein assigning said image-forming device settings to an image media tray comprises assigning image-forming device settings regarding media material, size, shape, material composition, color, weight, texture, roughness, resistivity, thickness, stiffness, grain direction, chemical composition, or acidity of said image media.

16. The method of claim 11, wherein providing said image media comprises providing printer paper, photocopy paper, or transparencies.

17. The method of claim 11, wherein said image-forming device comprises a printer, a photocopy machine, a facsimile machine, or a scanner.

18. The method of claim 11, further comprising prompting a user to pass said the bar code over said bar code reader when said image-forming device senses an open tray.

19. The method of claim 11, further comprising accessing information regarding various image media from other databases, networks, or computers.

20. A method for identifying characteristics of image media loaded into an image-forming device, comprising:

providing image media, said image media being contained within a package, said package having a bar code on a surface of said package containing information about said image media;

sensing information encoded in said bar code with a bar code reader located external to a housing of the image-forming device;

modifying settings for said image-forming device based on said bar code information; and assigning said image-forming device settings to an image media tray in said image-forming device; and prompting a user to pass said the bar code over said bar code reader when said image-forming device senses an open tray.

* * * * *

UNITED STATES PATENT AND TRADEMARK OFFICE

CERTIFICATE OF CORRECTION

PATENT NO. : 7,072,596 B2
APPLICATION NO. : 10/695254
DATED : July 4, 2006
INVENTOR(S) : Smith et al.

It is certified that error appears in the above-identified patent and that said Letters Patent is hereby corrected as shown below:

Title Pg, Item (57) Abstract:
Line 1, delete “Method” and insert therefor --method--.

Col. 8, Ln. 35, Delete “the”.

Signed and Sealed this

Nineteenth Day of June, 2007

JON W. DUDAS
*Director of the United States Patent and Trademark Office*